Dec. 23, 1969    M. MAKANSI ET AL    3,485,710
FUSED PLEATED CELLULAR SHEETS
Filed Feb. 20, 1968    3 Sheets-Sheet 1

INVENTOR
Munzer Makansi

Winfield L. McKenica
Walter N. Kirn Jr.
BY
AGENT

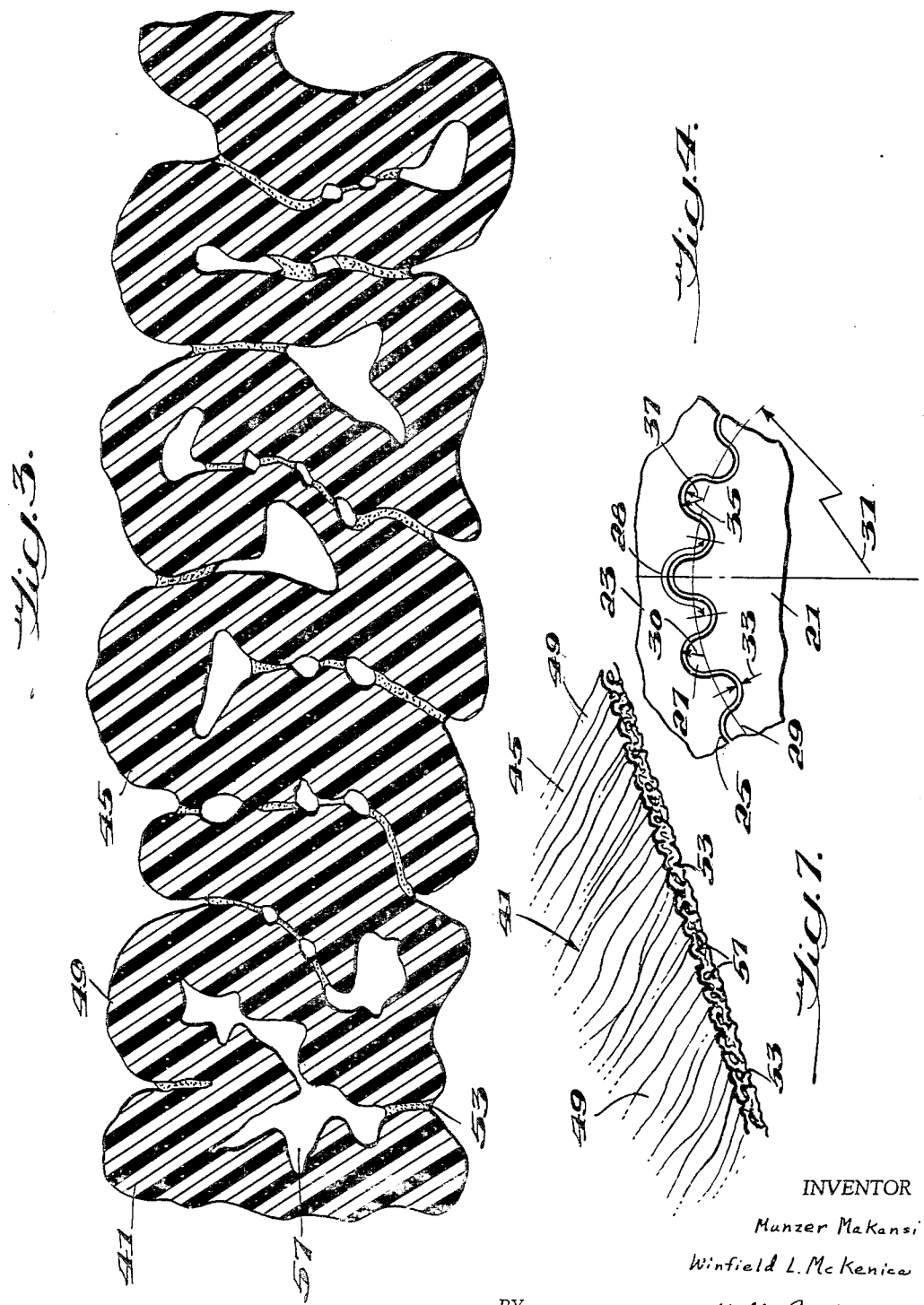

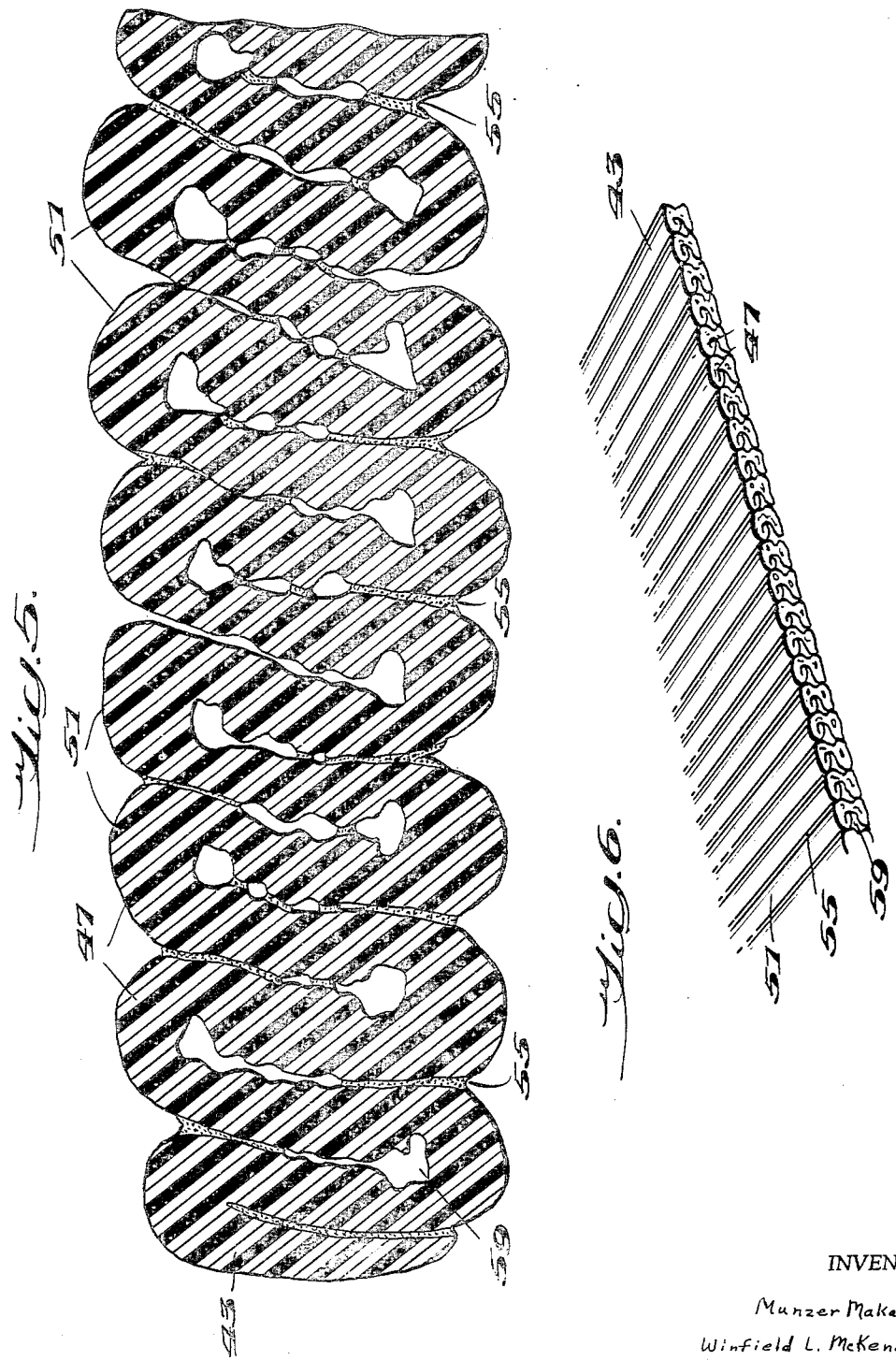

United States Patent Office 3,485,710
Patented Dec. 23, 1969

3,485,710
FUSED PLEATED CELLULAR SHEETS
Munzer Makansi, Signal Mountain, Tenn., and Winfield L. McKenica, Wilmington, Del., assignors to E. I. du Pont de Nemours and Company, Wilmington, Del., a corporation of Delaware
Continuation-in-part of application Ser. No. 428,465, Jan. 27, 1965. This application Feb. 20, 1968, Ser. No. 711,151
Int. Cl. B32b 3/28, 1/00
U.S. Cl. 161—123                                    7 Claims

ABSTRACT OF THE DISCLOSURE

Microcellular and ultramicrocellular sheets consisting of longitudinal, parallel pleats fused to one another and containing at least one void channel within each pleat.

---

This application is a continuation-in-part of our copending application, Ser. No. 428,465, filed Jan. 27, 1965, now abandoned.

This invention relates to novel foam products. More particularly, it relates to pleated microcellular and ultramicrocellular sheet products.

Whenever a gel or solution is extruded through a circular, endless slot under such conditions that extremely rapid expansion due to foaming results, so that initially the radius of the extruded tube increased more rapidly than does its displacement away from the orifice, the tube must fold along its perimeter in order to accommodate the rapid expansion. Distinct pleats remain around the whole periphery of the expanded tubular product (or along the width of a sheet extruded from a simple, linear slot) with the "valleys" and "crests" of the pleats being about parallel to the direction of extrusion. This pleat formation has been considered undesirable, and various means have been employed to eliminate it. For example, by passing the tubular foamed product between nip rolls a short distance beyond the extrusion orifice, gaseous expanding agent is trapped within the tube thereby exerting a pressure which flattens the naturally formed pleats so that a pleat-free sheet product is obtained. The pleats can also be removed by laterally stretching the completely solidified product and then pressing or calendering the sheet to permanently flatten it. Other methods for removing these naturally occurring pleats are known.

It has now been discovered that with certain materials, pleat formation can be utilized in obtaining a product which exhibits highly desirable properties such as increased thickness and lower bulk density which make the product aptly suited for many commercial applications. For example, Belgian Patent No. 625,829 corresponding to U.S. Patent 3,227,664 and U.S. Patent 3,227,784, and U.S. application Ser. No. 664,781, filed Aug. 31, 1967, the disclosures of which are incorporated herein by reference, describe ultramicrocellular and microcellular sheet products, respectively, and the processes for making them by extrusion through a sheet-forming orifice. The extruded sheet product ordinarily has a thickness less than about 0.125 in. (0.318 cm.), depending on the gap-width of the orifice through which it is extruded, the orifice being preferably a circular, endless slot. In many uses to which these cellular sheet products are especially well suited, the sheets as produced must be laminated to form a thicker, cellular sheet structure. The thickness of a single sheet can, in principle, be increased by enlarging the gap-width of the orifice; but, in practice, gap-widths large enough to produce desirably thick cellular sheets always result in unmanageably high extrusion velocities.

This invention provides a relatively thick, low bulk density pleated foam product comprised of microcellular, or ultramicrocellular, low density, thermoplastic material. A provision of this invention is a pleated foam product comprised of microcellular or ultramicrocellular, low density, thermoplastic material in which adjacent pleats are fused such that a relatively great transverse force is needed to separate adjacent pleats. Still another provision is such a pleated foam product in which the pleats are arrayed in generally parallelized fashion across the transverse dimension of the foam product. Other provisions will appear hereinafter.

These provisions result from the following invention which is a foam product comprising a longitudinally pleated microcellular or ultramicrocellular sheet, the pleats of said product providing generally the entire thickness of said product and occurring in periodic and generally parallelized succession across the transverse dimension of said product, sides of adjacent pleats being fused to one another so as to remain bonded under transversely applied forces of less than about 0.1 lb./in. (18 gm./cm.), the crests of the pleats defining surfaces of the foam product, and within each of said pleats there being at least one void channel extending essentially the length thereof. This product is provided by a process which comprises heating a confined mixture of a polymer plus at least one activating liquid to a temperature and pressure at which a homogeneous solution is formed, which temperature is greater than the boiling point of the activating liquid, then rapidly extruding the solution through a sheet-forming orifice into a region of substantially lower temperature and pressure whereby the rapid expansion of the extruded material results in pleating of the sheet along its transverse dimension and vaporization of the activating liquid so rapidly cools the mass to a temperature at which the polymer precipitates that the orientation produced by the rapid extrusion and expansion is set in the cell walls and the pleats coalesce along continuous lines of contact.

In the context of the present invention the term "ultramicrocellular" means the structure as described in U.S. Patent 3,227,664. Briefly, it refers to the structure of a thermoplastic, linear, crystalline organic polymer of film forming molecular weight, wherein substantially all of the polymer is present as filmy walls of generally polyhedral shaped cells, with a median diameter less than 1000 microns, the individual filmy walls being less than 2 microns in thickness and exhibiting uniform texture and the crystallites of the polymer in individual filmy walls exhibiting uniplanar orientation.

In the context of the present invention the term "microcellular" means the structure as described in U.S. application Ser. No. 664,781, filed Aug. 31, 1967. Briefly, it refers to the structure of a thermoplastic linear, crystalline organic polymer of film forming molecular weight, wherein substantially all of the polymer is present as filmy walls of generally polyhedral shaped cells with a median diameter of at least 500 microns, the individual filmy walls being less than 3 microns in thickness and the polymer having a work-to-break value of at least 10,000 in.-lbs./in.$^3$.

This invention, and various embodiments thereof, will be more clearly understood by reference to the accompanying drawing in which:

FIGURE 3 is a typical cross-section of a product of this invention obtained by extrusion through the die orifice of FIGURE 2 and being shown in the plane perpendicular to the extrusion direction;

FIGURE 4 is a plan view of a portion of a die modified to provide the preferred product of this invention;

FIGURE 5 is a cross-section of the preferred product of this invention, obtained by extrusion through the die of FIGURE 4;

FIGURE 6 is a perspective view of the product shown in cross-section in FIGURE 5; and FIGURE 7 is a perspective view of the product shown in cross-section in FIGURE 3.

Figure 1:
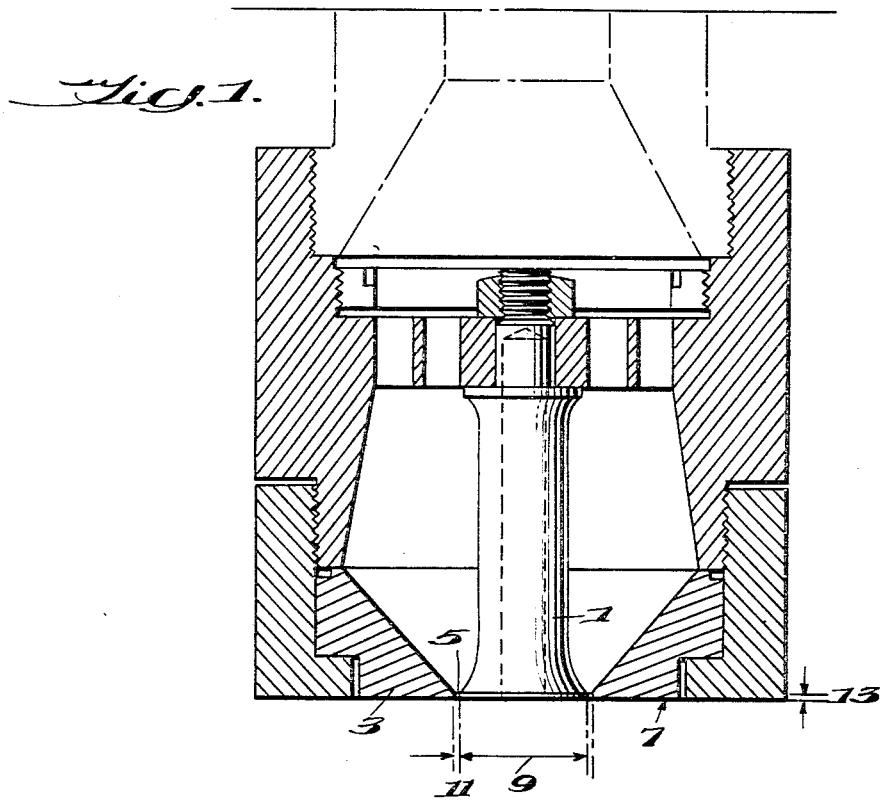
FIGURE 1 is an elevation view in cross-section of one form of extrusion die suitable for preparing the product of this invention.
Figure 2:
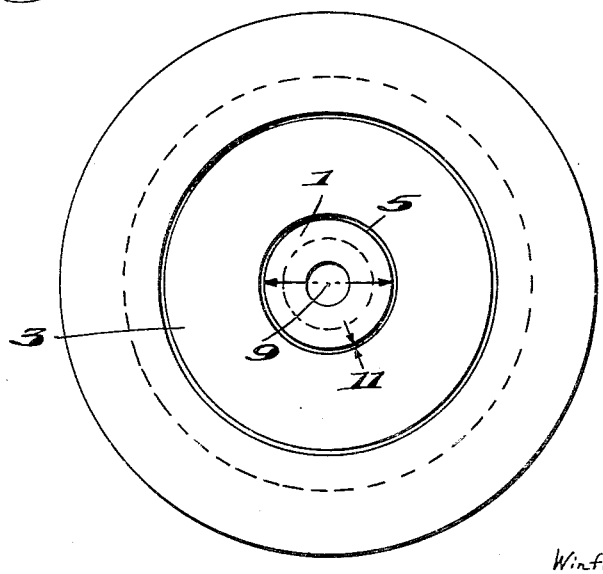
FIGURE 2 is a plan view of the exit face of the die of FIGURE 1.

Referring now to the drawings, FIGURE 1 is a die suitable for the extrusion of the product of this invention. The die may be fastened to an extruder (not shown) by any known conventional means. The inner die element 1 and the outer die element 3, both of which are mounted by conventional means (not shown) to an extruder, define an orifice 5 at exit surface 7 which, in the embodiment shown in FIGURES 1 and 2, is a circular annulus with diameter 9. The orifice 5 has a gap width 11 and a land length 13.

FIGURE 4 illustrates a modification of the die of FIGURE 1. Instead of the circular annular extrusion orifice 5, the inner die portion 21 and the outer die portion 23 define an endless slot orifice 25 which makes undulations 27 about a baseline 29 which is here defined by the pitch diameter 31. Because of the appearance of the orifice illustrated in FIGURE 4, the die is termed a gear die. In the preferred form of the gear die, the periodic undulations 27 are substantially semi-circular in shape so that the gap width 33 is the difference between the outer radius 35 and the inner radius 37 of the semi-circles. Critical dimensions for the undulations 27 are denoted by numeral 28, which is the peripheral length of one complete undulation, and 30, which is the maximum deviation from the baseline. The significance of these dimensions will be discussed hereinafter. In operation, employing the die of FIGURE 1 (the extrusion process for the modification illustrated in FIGURE 4 is the same) the solution of the polymer in an activating liquid, at elevated temperature and pressure, is extruded through orifice 5 defined by inner die 1 and outer die 3. Immediately on passing the exit surface 7, the solution encounters a region of much lower pressure whereby foaming of the solution occurs and the peripheral length of the extruded tube almost instantaneously increases to a value substantially greater than the circumference of the orifice 5. The rapid expansion of the tube while it is constrained to the orifice diameter 9 at surface 7 necessarily results in folding of the tube along its periphery to accommodate the increased peripheral length. The folding produces pleats which remain in the finished microcellular sheet structure.

FIGURES 3 and 7 show in cross-section and perspective view, respectively, the sheet product 41 extruded through the die having the orifice of FIGURE 2. FIGURES 5 and 6 show in cross-section and perspective, respectively, the sheet product 43 extruded through the die having the orifice of FIGURE 4. Sheet products 41 and 43 are comprised of pleats 45 and 47, respectively, which extend longitudinally of the respective sheets and in periodic and generally parallelized succession across the transverse dimension thereof. The crests 49 and 51 of pleats 45 and 47, respectively, define surfaces of their respective sheet products. In both products 41 and 43, adjacent pleats are fused to one another, along at least one substantially continuous line or plane of contact, for example, at points 53 and 55, respectively, on products 41 and 43. Within the area circumscribed by each pleat of FIGS. 3 and 5, there is at least one void channel 57 and 59, respectively, extending essentially the length thereof. As is evident from a comparison of the several figures, the sheet product 43 shown in FIGURES 5 and 6 obtained by extrusion through the die orifice illustrated in FIGURE 4 is more nearly uniform in all respects than the corresponding sheet product 41 shown in FIGURES 3 and 7 obtained by extrusion through the die orifice illustrated in FIGURE 2. The pleats 47 are substantially straight, parallel, equally spaced laterally, and continuously fused together throughout the whole length of the extruded sheet product 43 whereas the pleats 45 of sheet product 41 may be characterized only as generally parallel.

The following example, in which all parts and percentages are by weight unless otherwise stated, are given to illustrate the invention, and are not intended to limit the scope thereof in any manner. Melt flow is determined using ASTM Test Method No. D1238–62T—Condition L, and melt index by Condition E of the same method.

EXAMPLE 1

An extruder-mixer is used to prepare a solution of the following components:

| | Parts |
|---|---|
| Polypropylene | 50.0 |
| Fluorotrichloromethane | 44.4 |
| 1,2-dichloro-1,1,2,2-tetrafluoroethane | 5.0 |
| n-Butyl alcohol | 0.5 |

Dispersed in the solution is 0.1 part of silica aerogel. The polypropylene has a melt flow of 0.4 at 230° C. The extruder-mixer has a 2.0 in. (5.08 cm.) diameter screw, a 30.0 in. (76.2 cm.) long extruder section, and a 22.0 in. (55.9 cm.) long mixer section. Into the polymer, which is melted and pressurized by passage through the extruder section, the other components are injected, and the uniform solution results from passage through the mixer section under conditions selected to discharge solution at 155° C. and 600 p.s.i.g. (42.3 kg./cm.$^2$ gauge).

The solution from the extruder-mixer is discharged into a holding vessel of elongated, cylindrical shape having a hydraulically operated free piston at one end of the solution column and a valve-operated extrusion die at the other end. During filling of the holding vessel, the aforesaid solution temperature and pressure are maintained. On opening the valve, the solution is extruded through the die and forms the ultramicrocellular sheet product of this invention.

The extrusion die is of the type illustrated by FIGURE 4 characterized by having an orifice which makes undulations about the baseline in generally circular shape. The pitch diameter is 2.0 in. (5.08 cm.) and the gap width of 0.005 in. (0.0127 cm.) results from an outer radius of 0.0311 in. (0.0790 cm.) and an inner radius 46 of 0.0261 in. (0.0663 cm.). The land length is 0.100 in. (0.254 cm.). With this geometry, there are 60 complete cycles of the periodic, generally circular orifice deviations.

The thickness of the fused pleated sheet product is about 0.310 in. (0.787 cm.), and its density, computed from this thickness and the weight of a known area of the sheet, is 0.011 gm./cm.$^3$. When the extruded tube is slit along the direction of extrusion and opened up, its width is about 8.75 in. (22.22 cm.) and there are 60 parallel and uniform pleat crests visible on either surface of the opened sheet.

After all the fused areas of this sheet are separated, a sheet with a maximum thickness of 0.065 in. (0.165 cm.) is obtained for which the density by fluid displacement is 0.015 gm./cm.$^3$. Therefore, the sheet with fused pleats is about 5 times thicker and 40% less dense than the corresponding sheet from which the pleats are removed.

Sections of the fused pleated sheet product are cut and mounted in a tensile testing device which exerts a force in the plane of the sheet and at right angles to the extrusion direction (direction followed by visible pleat crests). An average force of 0.8 lb./in. (143 gm./cm.) of sheet length is required to separate the fused areas.

Although the process as described is a batch process in that first the extruder-mixer is used to fill a holding vessel and then the solution is extruded from the holding vessel, a continuous process readily results when a larger extruder-mixer is used capable of supplying sufficient solution at the elevated temperature and pressure either to continuously replenish the solution in the holding vessel or to extrude directly through a die at the exit end of the mixer section of the extruder-mixer.

EXAMPLE 2

The extruder-mixer and holding vessel of Example 1 are used to prepare a solution of the following components in parts by weight.

| | Parts |
|---|---|
| Linear polyethylene | 47 |
| Fluorotrichloromethane | 52 |

Dispersed in the solution is 1 part of silica aerogel. The linear polyethylene has a melt index of 0.5 at 190° C. Before and during extrusion, the solution in the holding vessel is maintained at 155° C. and 500 p.s.i.g. (35.2 kg./cm.$^2$ gauge).

The extrusion die is of the type illustrated by FIGURES 1 and 2, the orifice being a circular endless slot with a diameter of 1.5 in. (3.81 cm.), a gap width of 0.010 in. (0.0254 cm.), and a land length of 0.060 in. (0.152 cm.).

When the extruded tube is cut along the direction of extrusion and opened up, a sheet about 5.2 in. (13.2 cm.) in width results having 62 to 67 pleat crests on each surface. This product is not as uniform geometrically as the product of Example 1. The average thickness, for instance, is 0.150 in. (0.381 cm.), but local thickness variations between about 0.12 and 0.20 in. (0.30 and 0.508 cm.) exist. Its density, based on the average thickness and its area weight of 1.4 oz./yd.$^2$ (4.75 gm./m.$^2$), is about 0.0124 gm./cm.$^3$. The force in the plane of the sheet and perpendicular to the extrusion direction which is required to separate the fused areas of the pleats, varies between about 0.2 and 1.0 lb./in. (36 to 178 gm./cm.).

On removing the fused pleats from this specimen, a sheet is obtained having an area weight of 0.4 oz./yd.$^2$ (13.6 gm./m.$^2$), a density measured by fluid displacement of about 0.021 gm./cm.$^3$, and a maximum thickness of about 0.025 in. (0.0635 cm.). The fused pleated sheet is, then, 3.7 times greater in area weight, about 40% lower in density, and about 6 times thicker than the same sheet from which the pleats are removed.

EXAMPLE 3

Using the extruder-mixer, holding vessel, and extrusion die as employed in Example 1, a solution is made from

| | Parts |
|---|---|
| Polypropylene | 55 |
| Methylene chloride | 38.2 |
| Perfluorocyclobutane | 6.3 |
| n-Butyl alcohol | 0.25 | in which is dispersed 0.25 part of silica aerogel. The temperature and pressure of the solution in the holding vessel are 155° C. and 1300 p.s.i.g. (91.5 kg./cm.$^2$ gauge) respectively. The pressure at the die is maintained at 930 p.s.i.g. (65.5 kg./cm.$^2$ gauge) during extrusion from the die orifice. As in Example 1, the extruded sheet is about 8.4 in. (21.3 cm.) wide and has 60 parallel, uniform pleats fused together such that an average force of about 0.9 lb./in. (161.0 gm./cm.) is required to separate the fused areas between the pleats.

The thickness of the fused, pleated sheet product is about 0.263 in. (0.67 cm.), and its density, computed from this thickness, the weight of the sheet, and its area, is 0.012 gm./cm.$^3$. When the pleats are removed from the specimen just described by separating all of the fused areas, a maximum sheet thickness of about 0.022 in. (0.056 cm.) is measured, and its density by fluid displacement is 0.014 gm./cm.$^3$. The fused pleated sheet is then about 11 times thicker and 15% less dense than the corresponding sheet without pleats.

EXAMPLE 4

A fused, pleated, tubular, microcellular product as illustrated in FIGURES 5 and 6 is prepared by extruding a uniform solution of stereo-regular polypropylene at 140° C. and under 500 p.s.i.g. (35.2 kg./cm.$^2$ gage) through a gear die into the ambient atmosphere. The uniform solution is composed of the following materials:

| Material | Parts |
|---|---|
| Stereo-regular polypropylene | 45 |
| Trichlorofluoromethane | 49.5 |
| Sym-dichlorotetrafluoroethane | 4.5 |

The polymer chips (melt flow rate about 4 and density about 0.91 gm./cc.) are melted in a screw extruder before injection of the other liquid components in a mixing section. No finely divided solid nucleating agent (e.g., silica aerogel) is used, and the product has relatively large foam-cells with a rather broad cell-size distribution. The gear die employed is substantially as described in Example 1 except that: (1) the inner radius 37 is reduced to provide a gap width of 0.01 inch (0.0254 cm.), and (2) the land length is increased to 0.26 inch (0.66 cm.).

The tubular product is slit longitudinally and opened to provide a single-thickness sheet with an area-weight of about 1.84 oz./yd.$^2$ (62.4 gm./m.$^2$) and a substantially uniform thickness of about 0.26 inch (0.66 cm.). The pleat crests visible on either surface are straight, parallel, and evenly spaced. About 0.2 lb./in. (36 gm./cm.) of transverse force in the plane of the sheet is required to cause separation of fused areas between adjacent pleats. When all the fused areas are separated and the sheet tensioned slightly to flatten the pleats, the average thickness of the sheet is about 0.101 inch (0.257 cm.).

The sheet products of this invention are comprised of microcellular and ultramicrocellular materials characterized as follows: They are foams of thermoplastic, synthetic-organic, polymeric substances, the cells of which are polyhedral in shape and which, under microscopic examination, strongly resemble the inner bubbles of soap suds. Substantially all of the polymer is in the walls of these cells, each wall being a thin film ordinarily less than about 2 microns thick. Essentially all of the cells are closed cells, however, a minor fraction of the cells may have their walls normal to the direction of extrusion ruptured so that two or more cells form short tubes along the direction of extrusion. Conditions of extrusion are preferably selected to minimize the formation of these tubular cells. The apparent density of the extruded cellular material is between 0.5 and 0.005 gm./cc. The cells of the ultramicrocellular product have a maximum transverse dimension of less than about 1000 microns, whereas the microcellular product's median cell diameter is in the range of from about 500 microns to about 2000 microns.

Cell wall thicknesses and transverse cell dimensions are determined by microscopic examination of cross-sections cut from the extruded microcellular sheet material. Sections from 20 to 60 microns thick may be cut from a frozen sample with a razor blade. Large cell (>50 microns), in a transverse direction, samples are frozen directly in liquid nitrogen, but samples with smaller cells are preferably "imbedded" in water containing a detergent, frozen, and then sectioned. For very thin-walled samples (<1 micron), the wall thickness is best measured using an interferometer microscope. A layer of the sample is peeled off by contact with "Scotch Tape" a pressure sensitive adhesive tape sold by the Minnesota Mining and Manufacturing Co., freed from the tape by immersion in a suitable solvent such as chloroform, and subsequently placed on the stage of the interferometer microscope for measurement.

Preferred cellular materials are the ultramicrocellular and microcellular products as disclosed by Blades and White in U.S. Patent No. 3,227,664, and U.S. application Ser. No. 664,781, filed Aug. 31, 1967, respectively. Ultramicrocellular materials are additionally characterized in that their cell-walls exhibit uniplanar orientation and uniform texture as completely described in Columns 3 and 4 of the aforesaid patent.

The process by which the sheet of microcellular or ultramicrocellular material is obtained comprises heating a confined mixture of a polymer plus at least one activating liquid (as hereinafter defined) to a temperature and pressure at which a homogeneous solution is formed, which temperature is greater than the boiling point of the liquid. The term "boiling point" as used herein refers to the temperature at which a liquid boils under an external pressure of one atmosphere. This homogeneous solution, either under autogenous or higher pressure, is extruded, abruptly through a sheet-forming orifice into a region of substantially lower pressure and temperature (to obtain ultramicrocellular sheets the conditions must be such that a very large number of bubble nuclei exist at the extrusion orifice). The conditions selected for extrusion are such that vaporization of the activating liquid, which produces the cellular structure, so rapidly cools the mass to the temperature at which the polymer precipitates that the orientation produced by the rapid extrusion and expansion is frozen (quenched) in the cell walls. Vaporization of the liquid, precipitation of the polymer, formation of the cells, and quenching of the oriented cell walls all occur within a small fraction of a second, i.e., 0.01 second or less.

Suitable activating liquids for use in this process should have the following characteristics:

(a) The liquid should have a boiling point at least 25° C., and preferably at least 60° C., below the melting point of the polymer used;

(b) The liquid should be substantially unreactive with the polymer during mixing and extrusion;

(c) The liquid should be a solvent for the polymer under the conditions of temperature, concentration, and pressure required for extrusion;

(d) The liquid should dissolve less than 1% of the high polymeric material at or below the liquid's boiling point;

(e) The liquid should form a solution which will undergo rapid vaporization upon extrusion, forming a nongel polymer phase, i.e., a polymer phase containing insufficient residual liquid to plasticize the structure. In these requirements, the process differs radically from conventional foam-producing techniques. Choice of a suitable activating liquid is, of course, dependent on the particular polymer in question. Among those found especially useful are hydrocarbons and halogenated hydrocarbons, such as methylene chloride, fluorotrichloromethane, hexane, pentane, and ethyl chloride. Alcohols, such as methanol and ethanol, and alcohol-water mixtures are also frequently useful for this purpose.

The polymers suitable for use in this invention are synthetic, crystallizable, organic polymers, e.g., polyhydrocarbons such as linear polyethylene, stereo-regular polypropylene or polystyrene; polyethers such as polyformaldehyde; vinyl polymers such as polyvinylidene fluoride; polyamides both aliphatic and aromatic, such as polyhexamethylene adipamide and polymetaphenylene isophthalamide; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate; and equivalents. The polymers must be of at least film-forming molecular weight, i.e., of inherent viscosity of at least 0.2 dl./gm. Inherent viscosity is defined as the natural logarithm of the relative viscosity divided by the polymer concentration, 0.5 gm./dl. The relative viscosity is the quotient of the viscosity of the 0.5 gm./dl. solution of polymer and the viscosity, in corresponding units and at the same temperature, of the pure solvent used in forming the solution.

Preferred polymers for preparing the products of this invention include linear polyethylene, stereo-regular polypropylene, 6-nylon, and polyethylene terephthalate.

Common polymer additives such as dyes, pigments, antioxidants, delusterants, antistatic agents, reinforcing particles, adhension promoters, removable particles, ion exchange materials ultraviolet stabilizers, and the like may be mixed with the polymer solution prior to extrusion, if desired.

In prior art processes, means for providing pleatfree structures have always been provided. Theoretically, sheets of greater thickness after removal of the pleats can be produced by the present process, but it has been found that when the gap width exceeds about 0.030 in. (0.076 cm.), unmanageable extrusion velocities result. These latter velocities are of the order of from one to several thousand yards per minute, and the extrusion process becomes almost explosive. On the other hand, when the gap width is made smaller than about 0.003 in. (0.0076 cm.), flow irregularities occur which cause holes in the extruded sheet or even its disintegration. This is primarily because the velocity of solution flow through the orifice decreases with decreasing gap width until it is insufficient to prevent the expansion of bubbles within the extrusion orifice. Accidental impurities and microscopic solution inhomogeneity also contribute to disintegration of the extruded sheet at very low values of the gap width. In practice, gap widths of from 0.005 to 0.020 in. (0.0127 to 0.050 cm.) prove most satisfactory.

Subsequent to extrusion, the tube may be cut along its wall in a direction parallel to the extrusion direction and opened up to yield a sheet whose width equals the circumference of the uncut tube. If the pleat fusion does not occur, and the pleats are removed, the sheet thickness is normally considerably less than about 0.125 in. (0.318 cm.). When the pleats remain and are fused so as not to tear apart with subsequent processing, a sheet structure from 2 to 10 times greater in thickness results, the thickness of these pleated sheets, produced at manageable extrusion velocities, being between about 0.1 in. (0.25 cm.) and 1.0 in. (2.5 cm.).

Each pleat of the sheet structure of this invention is fused to both its nearest pleats so that the areas of contact cannot be separated by transverse forces of less than about 0.1 pounds per inch (18 grams per centimeter). Preferably 0.5 lb./in. (89 gm./cm.) is required, and still more preferably the sheet itself will tear before failure at fused areas occurs. Moreover, even the low rigidity of the sheet while being extruded and still in a plastic state is sufficient to prevent pleats forming as sharp angular creases. The pleats are always rounded, the areas of contact are always less than the total exposed adjacent areas, and the folding and fusion always result in the formation of void channels within the sheet and roughly parallel to the direction of extrusion. The apparent, bulk density of the sheet material of this invention is, thereby, from 10% to 50% less than the apparent density of extruded sheets in which the pleats are not allowed to remain or from which the pleats are removed. These apparent bulk densities for the fused, pleated, ultramicrocellular sheets are in the range 0.003 to 0.4 gm./cm.$^3$.

The expanded size of extruded cellular material at its initial point of full expansion is characterized by three mutually perpendicular linear expansion factors, that is, ratios of dimensions of an element of expandable solution from which it is formed. One factor, conveniently regarded as the length expansion factor, is the ratio of the dimension of this element along the direction of extrusion when fully expanded to that before passage through the extrusion die. Another, the thickness expansion factor, is a similar ratio measured normal to the surface of the expanded sheet. The third, or transverse expansion factor, is measured everywhere perpendicular to the other two dimensions, that is, transversely along the surface of the fully expanded tubular sheet. The nature of these three expansion factors is such that the volume of fully expanded cellular material produced from a given volume of expandable solution is simply the given volume of expandable solution times the thickness expansion factor times the length expansion factor times the transverse expansion factor. These three linear expansion factors are usually of nearly equal magnitudes, and extrusion processes to which this invention relates are characterized by linear expansion factors in the the range of about 2 to 5.

Under the extrusion conditions described, the formation of a pleated tube is inevitable for dies of practical size. As indicated by the above discussion on linear expansion factors, the peripheral length, P, of the extruded sheet, that is, its total transverse dimension measured completely around the extruded tube of fully expanded foam material and on its surface so as to follow exactly along the walls of whatever pleats exist, is given by the formula:

$$P = \pi D X \qquad (1)$$

where X is the transverse linear expansion factor, D is the mean diameter of the circular extrusion orifice, and $\pi D$ is the corresponding mean circumference of that orifice. For most extrusion processes, especially those in which full foam expansion occurs very near the die face, the diameter of the fully expanded tubular structure is constrained to a value less than that which provides a circular circumference equal to the peripheral length P, which peripheral length must result regardless. To accommodate this situation the extruded sheet forms longitudinal pleats. The average circumference, C, of the extruded tubular structure at the initial point of full foam expansion is given by $$C = \pi(D + L) \qquad (2)$$

in which L is the increase in average diameter of the extruded tubular structure over the average diameter, D, of the circular orifice. This circumference, C, is less than the peripheral length, P, of the extruded sheet which, by pleating along its periphery, has accommodated itself to the decreased circumference of the tubular product.

Combining Equations 1 and 2 yields a mathematical statement of those conditions under which pleats must form, that is, under which P exceeds C.

$$X > 1 + \frac{L}{D} \qquad (3)$$

A simple rearrangement of Equation 3 results in Equation 4 which expresses the conditions under which pleat-free sheets can form, that is, when P is less than or equal to C.

$$D \leq \frac{L}{X - 1} \qquad (4)$$

Although the derivation of Equations 3 and 4 is based on extrusion through a circular annular orifice as in FIGURE 2, similar considerations apply to other shapes of conventional sheet-forming orifices. In particular, Equations 3 and 4 apply unchanged to extrusion through a straight slot with the exception that D must be interpreted as the slot length and L the increase over D in width of the extruded pleated sheet.

In the production of suitable microcellular sheets the expansion and cooling rates are so rapid that L never exceeds 2 cm. and is usually less than or about 1 cm. Since X is characteristically about 3 for this process, it is obvious from Equation 3 that pleats must form unless D is less than about 1 cm., a dimension too small for the production of many commercially desirable sheet products.

These same factors are operative in all sheet-forming, foam-extrusion processes. In general, the number of pleats formed increases with decreasing thickness of the extruded sheet and with increasing extrusion velocity.

It is surprising, in such a high-speed extrusion process accompanied by rapid expansion and uncontrolled pleat formation, not only that the total number of pleats remains nearly constant throughout a given extrusion but also that most pleats have ampliudes so nearly equivalent to the average sheet thickness. Occasionally, however, large differences between pleat amplitude and sheet thickness occur, and, as can be seen from FIGURE 3, the pleats are not of the same size and general shape in cross-section.

Each pleat crest can easily be followed visually along the surface of the extruded sheet product, the crests giving the appearance of being the exposed portions of multiple, irregular, foamed strands adhering in side-to-side array. In the case of a product extruded through a circular annulus, it is obvious from an examination of the sheet surface that neither the number of pleats nor their size remains perfectly constant. This is evidenced by the facts that: (1) pleat crests are not necessarily perfectly parallel to the extrusion direction; (2) occasionally two pleats combine to form one; (3) about equally occasionally one pleat becomes two; and (4) as a result of (2) and (3), the lateral separation between pleats is not everywhere constant. Baseline shapes other than circles, such as straight lines, ellipses, ovals, etc. may be employed. If a polygonal shape with sharp changes in direction is used, the orifice of the gear die constructed about it is preferably designed so that the gap width is everywhere constant.

For esthetic reasons, it is preferable that the visible pleat crests be straight, parallel, and equally spaced laterally throughout the whole length of the extruded product. Such a uniformly pleated sheet may be prepared if, instead of a circular annular extrusion orifice, an endless slot orifice with the slot making periodic undulations about a predetermined baseline such as a circle is used. Because of the appearance of the orifice in its preferred form, the extrusion die containing this orifice is called a gear die. The cross-section of the gear die remains essentially unchanged from that shown in FIGURE 1 but its basic difference is illustrated by FIGURE 4 which shows a portion of the plan view of its exit surface.

The function of the gear die is to impose a fixed number of uniform pleats on the extruded microcellular sheet. In order to accomplish this, the orifice for the gear die must be designed to damp out pleats which would normally or naturally occur. This will happen when the peripheral length of each complete cycle of orifice undulation of the gear die is less than $$\frac{\pi L}{X - 1} \qquad (5)$$

where L is the increase in the average transverse dimension of the fully expanded microcellular product over the corresponding dimension of the orifice, X is the transverse linear expansion factor and $\pi$ is the universal constant 3.1416. The factors X and L are determined experimentally by extruding a particular composition capable of forming a pleated microcellular sheet through a conventional sheet-forming orifice such as a circular or straight-slot orifice and taking appropriate measurements of the orifice and product. In particular, L is the difference between the average transverse dimension of the fully expanded pleated product and the corresponding dimension of the conventional sheet-forming orifice. The latter dimension is, for a circular orifice, its diameter, and for a straight-slot orifice, its length. The transverse linear expansion factor X is, for the same product from which L is determined, the ratio of the peripheral length of the product and the corresponding dimension of the orifice through which the product is formed. For example, in extrusion through a circular orifice, the peripheral length of the tubular product is its width after it is slit longitudinally, opened up to a single thickness flat sheet, and tensioned or otherwise treated to flatten all the pleats. This peripheral dimension is denoted P in Equation (1). The corresponding dimension of the circular orifice is its mean circumference. In extrusion through a straight-slot orifice, the peripheral length of the extruded product is its width after all the pleats are flattened by transverse tensioning, and the corresponding dimension of the orifice is simply the length of the straight-slot orifice. It has been determined that if the peripheral length 28 of an orifice undulation exceeds about 0.5 in. (1.27 cm.), a naturally occurring pleat can form within the pleat imposed by the undulation. A further restriction on the orifice undulation is that if the maximum deviation of the undulation from the baseline is less than the gap width, the gear die is likewise ineffective in preventing the formation of naturally occurring pleats.

In the extrusion of microcellular sheets, orifice gap widths should be in the range from about 0.003 to 0.030 in. (0.008 to 0.076 cm.) and preferably from about 0.005 to 0.020 in. (0.013 to 0.05 cm.). When the gear die orifice deviates from the circle in the form of small semicircles, as in the preferred form of the gear die, these small semi-circles in turn should have inner radii 37 preferably ranging between about 0.005 and about 0.08 in. (0.013 and 0.20 cm.).

The sheet product of this invention is preferably obtained by extrusion through a gear die so that its cross-section is as shown in FIGURE 5. The number of pleats formed remains exactly constant throughout a given extrusion, and the number of pleat crests visible on either sheet surface equals the number of cycles of the periodic deviations of the orifice of the gear die (FIGURE 4). Moreover, each pleat crest is continuous throughout the length of the extruded sheet, is parallel to all other pleat crests, and contributes a substantially constant amount to the width of the sheet. The visible pleat crests give the sheet product the appearance of being comprised of uniform, continuous, microcellular strands adhered in parallel, side-to-side array.

Comparison of FIGURE 5 with FIGURE 3 shows that in cross-section, too, the product extruded through a gear die is more uniform. Every pleat has an amplitude substantially the same as the sheet thickness, and each is of substantially the same cross-sectional size and shape. The void channels in the preferred product are likewise more uniform in size, shape, distribution, and continuity along the length of the sheet.

Notwithstanding the increased regularity and uniformity imparted by gear die extrusion, the product is fused at certain areas so that transverse forces of less than about 0.1 pound per inch (18 gm./cm.) will not separate the pleats, and it is about 2 to 10 times thicker and 10% to 50% less dense than the corresponding sheet without fused areas when tensioned to flatten the pleats.

The extruded tubular microcellular or ultramicrocellular material of this invention can be slit along one side and opened up to form a sheet. If desired, it can be compacted normal to its surfaces to increase its density to any desirable value less than that of the uninflated polymer density. This compaction is achieved by the application of pressure to the sheet with or without the use of heat. The pressure and temperature for compaction should be selected so that the microcellular material does not melt because melting will result in loss of the cellular structure. Coincident with or in place of substantial compaction, either or both surfaces may be embossed with any desirable pattern.

For some uses, laminates containing the sheet product of this invention may be desirable. Two or more layers of the fused pleated microcellular or ultramicrocellular sheet product may be bonded together, for example, to create a thicker sheet. On either or both of the surfaces or sandwiched between the layers of the cellular material, other sheet products may be bonded. These latter sheet products include films, fabrics, papers, metal sheets and foils, plywood, and the like. Bonding of the sheet surfaces may be accomplished in many ways which include: (1) adhesives, e.g., pressure sensitive adhesives or hot melt adhesives; (2) melting the surface of the cellular sheet to render it self-adhesive; and (3) hot-embossing methods in which discreet and separate areas are rendered adhesive by melting. The laminated sheet structures can be embossed with any desirable pattern, bent, molded, or made to conform to any shape required.

Particularly useful laminates are those in which the fused pleated microcellular or ultramicrocellular sheet product of this invention has either or both of its surfaces bonded to films of unexpanded, thermoplastic, polymeric material. These polymeric films impart smoothness, toughness, and puncture resistance to the laminate. They also hold the pleats of the cellular material in constant relationship to one another so that flexing of the laminate will not result in separation of the fused areas holding the pleats together. Such useful polymeric films include those comprised of, for example, polyethylene terephthalate, polyethylene, polypropylene, polyvinyl chloride, ethylene-butene copolymer, and the like.

Where desirable, the sheet product of this invention or its laminates may be perforated to permit the ready passage of air or gases through the sheets.

The fused pleated cellular sheet products are particularly useful in: spring insulator pads for furniture, mattresses, and automobile upholstery; carpet underlayment; automobile headliners and floor coverings; package cushioning; protective padding for athletes; and other similar applications where its low density, shock absorption, and cushioning properties make it attractive.

What is claimed is:

1. A 3-dimensional foam product comprising a longitudinally pleated cellular sheet selected from the group consisting of ultramicrocellular and microcellular sheets, the pleats of said sheet product providing generally the entire thickness of said product and occurring in periodic and generally parallelized succession across the transverse dimension of said product, sides of adjacent pleats being fused to one another so as to remain bonded under transversely applied forces of less than about 0.1 lb./in., the crests of the pleats defining surfaces of the foam product, and within each of said pleats there being at least one void channel extending essentially the length thereof.

2. The 3-dimensional foam product of claim 1 wherein said cellular sheet is an ultramicrocellular sheet.

3. The 3-dimensional foam product of claim 2 wherein said longitudinally pleated ultramicrocellular sheet is comprised of linear polyethylene.

4. The 3-dimensional foam product of claim 2 wherein said longitudinally pleated ultramicrocellular sheet is comprised of stereo-regular polypropylene.

5. The 3-dimensional foam product of claim 1 wherein said cellular sheet is a microcellular sheet.

6. The 3-dimensional foam product of claim 5 wherein said longitudinally pleated microcellular sheet is comprised of linear polyethylene.

7. The 3-dimensional foam product of claim 5 wherein said longitudinally pleated microcellular sheet is comprised of stereo-regular polypropylene.

References Cited

UNITED STATES PATENTS

| | | | |
|---|---|---|---|
| 2,194,364 | 3/1940 | Minor | 161—122 |
| 3,193,438 | 7/1965 | Schafer | 161—89 |
| 3,227,592 | 1/1966 | Coates et al. | 156—93 |
| 3,227,664 | 1/1966 | Blades et al. | 260—2.5 |
| 3,227,784 | 1/1966 | Blades et al. | 264—176 X |

ROBERT F. BURNETT, Primary Examiner

R. O. LINKER, Jr., Assistant Examiner

U.S. Cl. X.R.

161—127, 132; 264—150, 177